May 14, 1929.  H. A. POVEL  1,712,840
LIPSTICK HOLDER
Filed Jan. 31, 1927
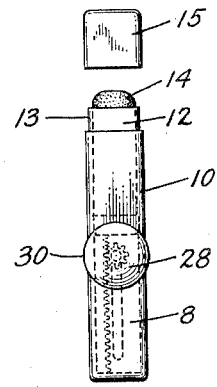
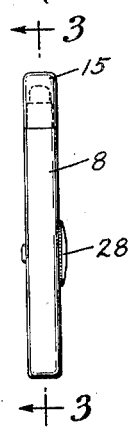
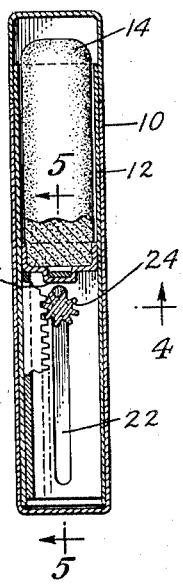
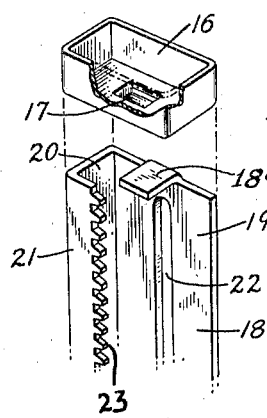
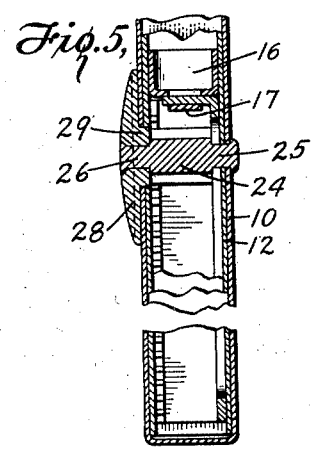
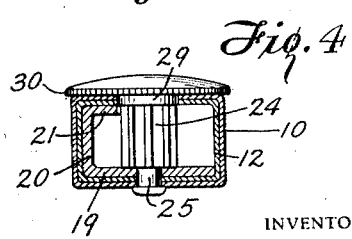
INVENTOR
H. A. Povel
BY
Townsend & Decker
ATTORNEYS Patented May 14, 1929.

1,712,840

UNITED STATES PATENT OFFICE.

HYACINTHE ALPHONSE POVEL, OF PARIS, FRANCE.

LIPSTICK HOLDER.

Application filed January 31, 1927. Serial No. 164,689.

This invention relates to improvements in lipstick holders, it being a primary object of the invention to provide an improved means for projecting the lipstick material to give access to the same.

It is a further object to provide a mechanism of this character which will occupy relatively small space thus permitting the outside dimensions of the lipstick holder to be retained at a minimum.

It is a still further object to so form the lipstick holder and operating mechanism that the operating elements will be placed longitudinally of the casing for the purpose of further reducing the thickness of the entire lipstick casing and advancing mechanism.

These and other objects will appear more fully from the following description when considered in connection with the drawing, in which:

Fig. 1 is a side elevational view of the separated lipstick holder and cover, parts of the advancing mechanism being indicated in dotted lines therein.

Fig. 2 is an edge elevational view of the complete lipstick holder.

Fig. 3 is an enlarged longitudinal sectional view taken substantially on the line 3—3 of Fig. 2.

Fig. 4 is a transverse section taken substantially on the line 4—4 of Fig. 3.

Fig. 5 is a longitudinal sectional view taken substantially on the line 5—5 of Fig. 3, and Fig. 6 is a perspective view of the separated lipstick holder and movable rack.

Referring in detail to the drawings, there is shown a lipstick body casing 8 formed of an outer casing 10 and inner casing 12. The outer casing 10 is preferably formed of substantially rectangular, cross-sectional shape and, as shown herein, is relatively thin to provide a neat device and one which will occupy very little space. The inner casing 12 which receives the lipstick 14, extends above the upper edge of the outer casing 10, as indicated at 13, the projecting portion 13 being designed to receive the cover 15 for protecting the lipstick 14. The inner casing 12 may and preferably does extend throughout the entire lenth of the outer casing 10 in order to strengthen the outer casing and form a suitable bearing for the transverse lipstick advancing members described below.

The improved means herein described for advancing or retracting the lipstick 14 comprises a cupped lipstick retaining member 16, secured to and movable with the longitudinally movable operating rack member 18, the rack member occupying substantially the entire lower half of the casing 10. The cupped member 16 is formed with a depressed portion 17 constructed to receive a tongue 18ª on the rack member 18 for securing these elements together as will be readily understood. The rack member 18 is preferably formed of sheet metal and comprises the angularly arranged portions 19, 20, and 21 fitted snugly within the lower portion of the casing, the side portion 19 being slotted as indicated at 22 and the extension 21 being provided with a series of rack teeth 23 on the free edge thereof for a purpose to be referred to in detail below.

The rack teeth 23 are engaged by the teeth formed upon the periphery of a small pinion 24. The pinion 24 is suitably supported upon the sides of the lipstick casing 8 and to this end may be formed with extensions 25 and 26, the former, in the present embodiment, having a direct bearing on the lipstick casing 8 and the latter receiving and being rigidly secured to the operating button or disk 28 as by means of the flanged head as shown. The disk 28 is formed with an enlarged bearing portion 29 preferably of a size slightly larger than the pinion 24, the bearing portion being received within an enlarged opening in one side of the casing 8. It will thus be seen that the pinion 24 has suitable bearings upon the two sides of the casing 8 as indicated at 25 and 29. The outer end of the bearing 25 may be riveted over to retain the pinion and disk in position, this bearing being received in the slot 22 to permit longitudinal movement of the rack member 18. The operating button 28 is preferably formed with one flat side for engagement flatwise against one side of the outer casing 10, the outer face thereof being rounded to provide a substantially smooth exterior free of objectionable projecting edges. The button 28 is preferably of a size such that it will project slightly beyond both edges of the lipstick container 8 as indicated at 30 herein, although it will be understood that it could be operated by having only one such edge project. In order to facilitate the ready extension or retraction of the lipstick the button 28 may have an outer knurled edge as indicated herein.

It will be seen that a lipstick holder as herein described may be exceedingly thin and at the same time provide for the ready projection or retraction of the lipstick. The elements forming the lipstick projection means are caused to lie substantially flat against the outer casing, the arrangement of outer and inner casings 10 and 12 as disclosed providing a convenient means for supporting the cover 15, so that the cover does not protrude outwardly beyond the outer casing 10.

It will be observed that the parts forming the lipstick holder and operating mechanism may be easily prepared and assembled, the mounting of the operating disk 28 and pinion 24 on the casing 8, with the teeth in mesh with the rack teeth 22 facilitating the ready assembling of the parts of the article.

It will be understood that replacements of the lipstick 14 may be readily accomplished by inserting a new lipstick 14 into the cupped member 16 and returning the latter to its innermost position as shown herein.

It will also be understood that the specific embodiment herein disclosed is merely illustrative of one form which the invention may assume and that I am to be limited only as set forth in the appended claims.

The invention claimed is:

1. A lipstick holder comprising a casing, a lipstick engaging member within said casing and movable longitudinally thereof, and means rotatable on a stationary axis transverse to said casing for projecting said lipstick engaging member.

2. A lipstick holder comprising a casing, means within said casing for advancing a lipstick therein, an operating disk rotatable on a stationary axis and lying flatwise against an outer side of said casing and means for operatively connecting said disk with said advancing means for operating the same.

3. In combination with a lipstick casing, means for projecting a lipstick therefrom, said means including a manually operable element, rotatable on a stationary axis extending transversely to said casing.

4. A lipstick holder comprising a casing, a cupped member slidable within said casing, a rack movable with said cupped member and a member rotatable on a fixed axis transverse to said casing and operatively associated with said rack for moving said cupped member and lipstick.

5. A lipstick holder comprising a casing, a lipstick engaging member within said casing and movable longitudinally thereof, means rotatable on a stationary axis transverse to said casing for projecting said lipstick engaging member and an operating disk lying flatwise against a side wall of said casing and operatively engaged with said projecting means for operating the same, said disk projecting beyond one edge of said casing.

6. In combination with a casing, an advancing element positioned within said casing and movable longitudinally thereof, a sheet metal rack member formed with a rack portion and secured to and movable with said element, a pinion within said casing mounted for rotation on a fixed axis and enmeshed with said rack, an operating element, said element and pinion being connected for rotation together, said rack forming member fitting snugly within said casing.

7. In a lipstick holder, a casing, a lipstick retaining element snugly fitted within said casing, a sheet metal rack forming member snugly fitted within said casing and secured to said element, said rack forming member including a series of rack teeth, and means enmeshed with said teeth for moving said rack member longitudinally of said casing.

8. In a lipstick holder, a casing, a lipstick retaining element snugly fitted within said casing, a sheet metal rack member snugly fitted within said casing and secured to said element, said rack member including a series of rack teeth, a supporting hub mounted for rotation on a fixed axis, a pinion thereon, and means for rotating said pinion and hub to move said rack member, said rack member having a slot for receiving said hub.

Signed at New York in the county of New York and State of New York this 14th day of January A. D. 1927.

HYACINTHE ALPHONSE POVEL.